United States Patent
Cariccia et al.

(10) Patent No.: US 9,964,177 B2
(45) Date of Patent: May 8, 2018

(54) DUAL MASS FLYWHEEL

(71) Applicant: DAYCO EUROPE S.R.L., Chieti (IT)

(72) Inventors: Gianluca Cariccia, Oristano (IT); Giacomo Giansetto, Chieti (IT); Andrea Montani, Torre Vecchia Teatina (IT); Andrea Guala, Biella (IT)

(73) Assignee: Dayco Europe S.R.L., Chieti (IT)

( * ) Notice: Subject to any disclaimer, the term of this patent is extended or adjusted under 35 U.S.C. 154(b) by 0 days. days.

(21) Appl. No.: 14/353,160

(22) PCT Filed: Oct. 22, 2012

(86) PCT No.: PCT/IB2012/055809
§ 371 (c)(1),
(2) Date: Apr. 21, 2014

(87) PCT Pub. No.: WO2013/057728
PCT Pub. Date: Apr. 25, 2013

(65) Prior Publication Data
US 2014/0338493 A1   Nov. 20, 2014

(30) Foreign Application Priority Data

Oct. 21, 2011  (IT) .............................. TO2011A0958
Nov. 7, 2011  (IT) .............................. TO2011A1020
Nov. 7, 2011  (IT) .............................. TO2011A1021

(51) Int. Cl.
*F16F 15/315*   (2006.01)
*F16F 15/31*   (2006.01)
(Continued)

(52) U.S. Cl.
CPC ............ *F16F 15/31* (2013.01); *F16F 15/137* (2013.01); *F16F 15/1333* (2013.01);
(Continued)

(58) Field of Classification Search
CPC .... F16F 15/12; F16F 15/1421; F16F 15/1213; F16F 15/1236
See application file for complete search history.

(56) References Cited

U.S. PATENT DOCUMENTS 4,181,208 A * 1/1980 Davis ........................... 192/207
4,782,936 A * 11/1988 Bopp ........................... 192/208
(Continued)

FOREIGN PATENT DOCUMENTS

CN    1955507 A   5/2007
DE    3823384     1/1990
(Continued)

OTHER PUBLICATIONS

JP, Computer Generated English Translation of JP 2006-250159A (Sep. 21, 2006).

*Primary Examiner* — Vicky A Johnson
(74) *Attorney, Agent, or Firm* — FisherBroyles, LLP; Susan M. Oiler (57) ABSTRACT

The dual mass flywheel comprises a spring assembly (4; 104; 112; 128; 129), if necessary, with two stages of which one can include a spiral spring. Furthermore, the dual mass flywheel comprises a friction damping system (111) that applies torque independently of the rotational speed of the flywheel.

15 Claims, 5 Drawing Sheets

(51) Int. Cl.
  *F16F 15/133* (2006.01)
  *F16F 15/134* (2006.01)
  *F16F 15/137* (2006.01)
  *F16F 15/139* (2006.01)

(52) U.S. Cl.
  CPC .... *F16F 15/1395* (2013.01); *F16F 15/13484* (2013.01); *Y10T 74/2132* (2015.01)

(56) References Cited

U.S. PATENT DOCUMENTS

| | | | |
|---|---|---|---|
| 5,104,356 A * | 4/1992 | Paquin et al. | 464/60 |
| 5,147,246 A * | 9/1992 | Focqueur | F16F 15/1213 |
| | | | 192/207 |
| 5,234,376 A * | 8/1993 | Chimner et al. | 464/27 |
| 6,010,408 A * | 1/2000 | Mueller et al. | 464/77 |
| 6,074,302 A * | 6/2000 | Stretch | 464/77 |
| 2004/0082392 A1 | 4/2004 | Fukushima et al. | |

FOREIGN PATENT DOCUMENTS

| | | | |
|---|---|---|---|
| DE | 3745197 | 6/2005 | |
| DE | 102004024747 | 12/2005 | |
| DE | 102009013965 | 9/2010 | |
| EP | 0294130 | 12/1988 | |
| FR | 2663387 | 12/1991 | |
| JP | 2006250159 A * | 9/2006 | |
| WO | 01/04507 | 1/2001 | |
| WO | WO 2013139983 A1 * | 9/2013 | ......... F16F 15/1338 |

\* cited by examiner

DUAL MASS FLYWHEEL

TECHNICAL FIELD

The present invention relates to an improved dual mass flywheel.

A dual mass flywheel comprises a primary mass driven in rotation by a crankshaft of an internal combustion engine, a secondary mass for driving the input shaft of a gearbox in rotation and a spring assembly to connect the primary mass to the secondary mass in an elastically torsional manner.

BACKGROUND ART

It is known that the spring assembly comprises at least two elastic units arranged in series and having different mechanical characteristics, such as torsional stiffness. The two elastic units are connected by a structure that has significant mass, which is the cause of undesired resonance.

In particular, an elastic unit can comprise a plurality of circumferential coil springs that torsionally connect the primary mass of the flywheel to the structure, the second elastic unit torsionally connecting the structure to the secondary mass and the structure being rotatable with respect to the primary and secondary masses.

DISCLOSURE OF INVENTION

The object of the present invention is to provide a dual mass flywheel with improved performance under dynamic conditions, for example, during resonance or following sharp and sudden braking.

The object of the present invention is achieved by a flywheel according to claim 1.

BRIEF DESCRIPTION OF THE DRAWINGS

The present invention will now be described with reference to the attached drawings, where.

BEST MODE FOR CARRYING OUT THE INVENTION

Figure 1:
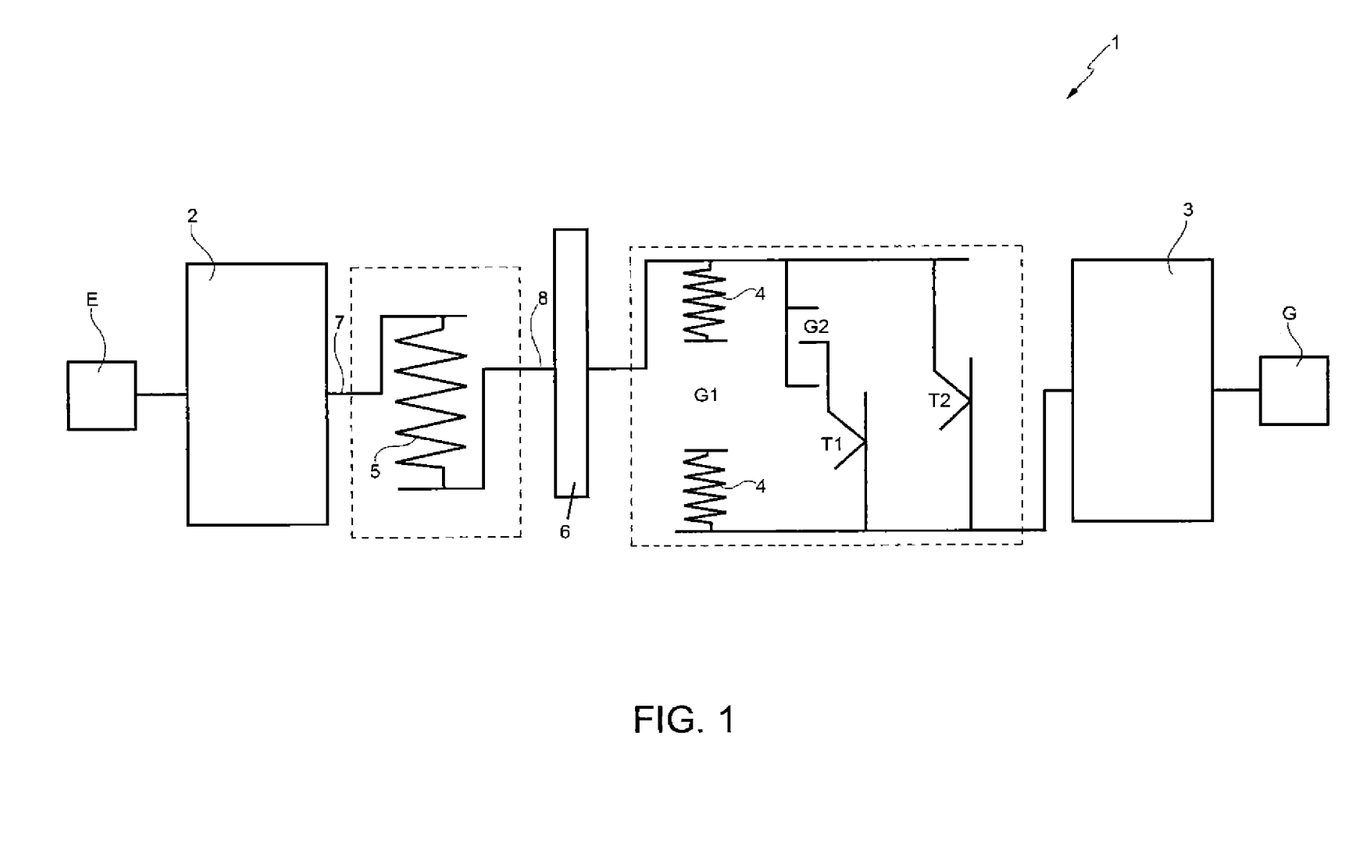
FIG. 1 is a schematic functional diagram of a dual mass flywheel according to the present invention.

In FIG. 1, reference numeral 1 refers to a dual mass flywheel comprising a primary mass 2 preferably connected to the crankshaft of an internal combustion engine and a secondary mass 3 preferably connected via a clutch to an input shaft of the gearbox G of a vehicle, a plurality of coil springs 4 arranged circumferentially to obtain a torsional action on the secondary mass and a further torsionally elastic element 5 arranged in series between the primary mass and the coil springs 4.

In particular, the torsionally elastic element 5 is connected to the coil springs 4 by means of a spring loader 6 of a non negligible mass with respect to that of the primary and secondary masses. The spring loader 6 is an element or structure configured to transfer torque from the elastic element 5 to the coil springs 4. The torsionally elastic element 5 is arranged so as to transmit torque to the coil springs 4 through the spring loader 6 when the primary mass 2 drives the secondary mass 3.

According to a preferred embodiment of the present invention, the elastic element 5 comprises a spiral spring, made of metal band or non-round wire, having a first end portion 7 rigidly connected to the primary mass 2 of the flywheel and a second end portion 8 rigidly connected to the spring loader 6.

According to a preferred embodiment of the present invention, the elastic element is a spiral spring having a number of turns defined by an angle of between 250° and 600° or between 225° and 600°, preferably between 275° and 425° and a cross-sectional height to width ratio of between 0.4 and 0.8, preferably between 0.5 and 0.7. In this description and in the claims, a spiral spring comprises turns or parts of turns having variable curvature and, in consequence, a variable radius. For example, at least a part of the spiral spring can be shaped like an Archimedean spiral. Furthermore, the turns can share a common median plane so as to be radially overlaid and define an empty radial space to avoid direct contact. Alternatively, the turns or parts of turns can also be axially offset with respect to one another. For example, there could be a number of spiral springs side by side in the axial direction, either with the respective sides in contact or having sides spaced apart in at least some or all operating conditions.

According to a further preferred embodiment, the cross-section of the elastic element 5 has a width of between 10 mm and 30 mm and a height of between 4 mm and 12 mm. The elastic element 5 is preferably made from a spring of flat metal band.

It has been demonstrated that to improve performance in fatigue resistance, it is of a certain importance that the fillet radius for connecting the flat faces of the elastic element 5 should be between 1 mm and 3 mm or between 0.5 and 3 mm, preferably between 0.75 and 1.75 mm. Preferably, the cross-section of the elastic element 5 is substantially rectangular. The foregoing characteristics serve, on their own or better still in combination, to obtain the desired range of stiffness or constant elasticity for uncoupling vibrations coming from the primary mass of the flywheel 2 and, at the same time, the desired fatigue resistance.

The elastic element 5 and the plurality of coil springs 4 are arranged in series between the primary mass 2 and the secondary mass 3, the spring loader 6 being interposed between the elastic element 5 and the coil springs 4. According to the present invention, the overall torsional stiffness of the coil springs 4 measured between the spring loader 6 and the secondary mass 3 is greater than the torsional stiffness of the elastic element 5.

The coil springs 4 are preferably connected between the spring loader 6 and the secondary mass 3 so that an empty circumferential space G1 is provided. Thus, when the spring loader 6 and the secondary mass 3 move relatively in an angular direction, the empty circumferential space G1 will be closed before the coil springs 4 become circumferentially loaded.

In addition, the dual mass flywheel 1 comprises a damping device having a first unit T1 and a second unit T2.

The damping device is provided between the spring loader 6 and the secondary mass 3, and the damping units T1 and T2 are connected in parallel with respect to the spring loader 6.

Preferably, the damping unit T1 is configured so that an empty circumferential space G2 is provided. Thus, when the spring loader 6 and the secondary mass 3 move relatively in an angular direction, the empty circumferential space G2 will be closed before the damping unit T1 provides its angular damping action.

Conversely, the damping unit T2 is configured so that the angular damping action of T2 is provided for any angular displacement of the spring loader 6 and the secondary mass 3. Preferably, the damping unit T2 comprises a fixed coupling bush between the spring loader 6 and the secondary mass 3 of the flywheel to provide a friction coupling.

Thus, the torsional damping effect occurs when the spring loader 6 and the secondary mass 3 move relatively in an angular direction. Preferably, G1 is greater than or equal to G2 so that the damping unit T2 is activated before or at the moment when the coil springs 4 are loaded. Therefore, it is possible to envisage an operating condition, namely when the relative angular movement between the spring loader 6 and the secondary mass 3 is less than G1, where damping is effective and the coil springs 4 are not loaded. In particular, the damping units T1 and T2 provide a respective constant level of damping such that when the empty space G2 is closed, the overall damping torque between the spring loader 6 and the secondary mass 3 of the flywheel increases from a first level to a second level, greater than the first level (see FIG. 2).

Thus, according to the present embodiment, an overall damping effect is provided that changes the damping between the spring loader 6 and the secondary mass 3 in a discontinuous manner between at least two values. In particular, the discontinuous damping rate is obtained by providing the empty space G2.

Figure 4:
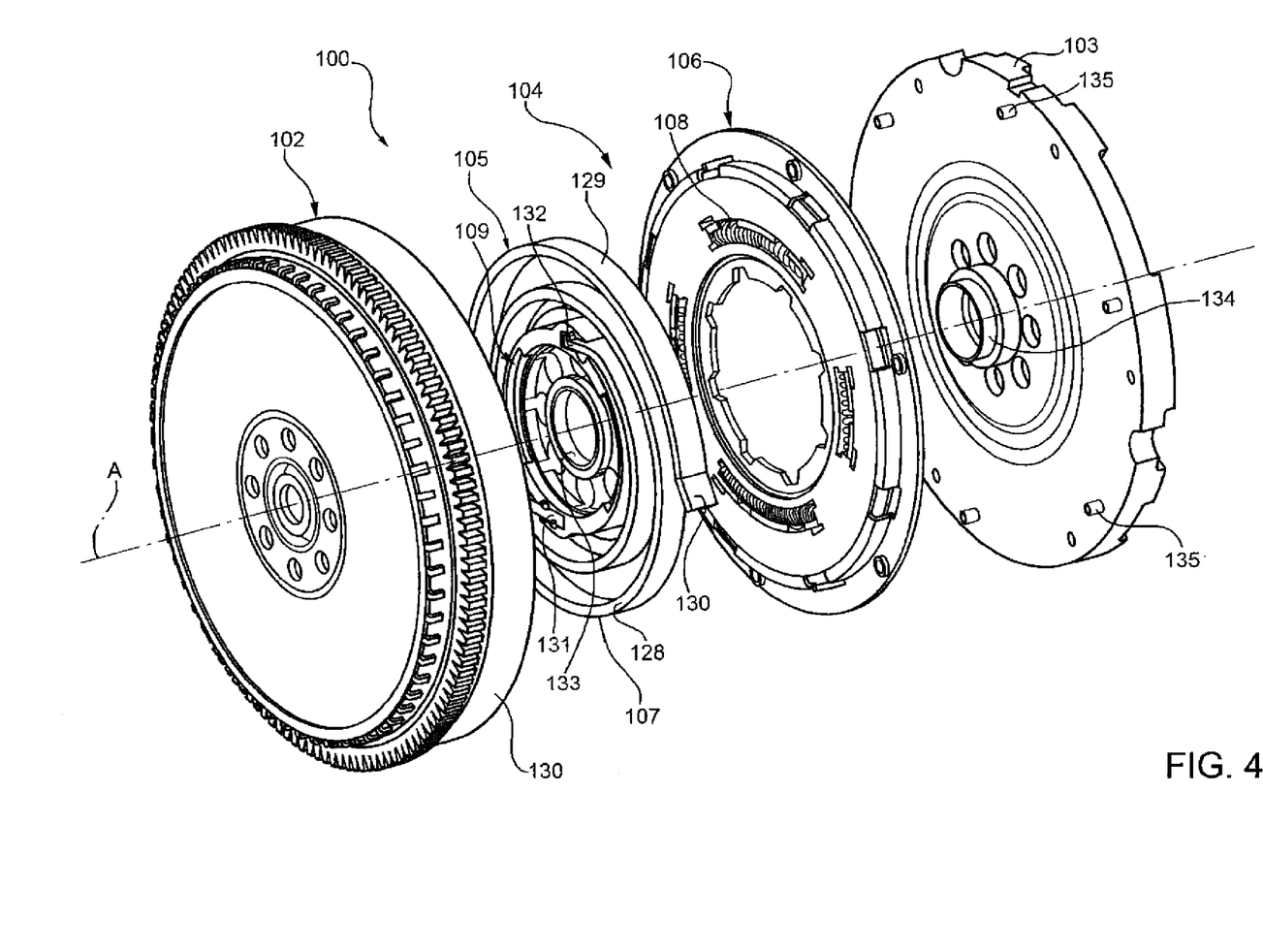
FIG. 4 is an exploded perspective view of a dual mass flywheel according to a further embodiment of the present invention.

In FIG. 4, reference numeral 100 indicates, as a whole, a dual mass flywheel comprising a primary mass 102 suitable for being connected to a crankshaft (not shown) of an internal combustion engine, a secondary mass 103 suitable for being connected, for example, to an input shaft of a gearbox (not shown) and rotatable around an axis A with respect to the primary mass 102, and a spring assembly 104 to torsionally connect the primary mass 102 to the secondary mass 103.

The spring assembly 104 comprises a first stage 105 connected to the primary mass 102 and a second stage 106 connected in series to the first stage 105 and to the secondary mass 103. The first stage 105 comprises an elastic device 107 and the second stage 106 comprises an elastic device 108 having a torsional stiffness different from that of elastic device 107. Preferably, the torsional stiffness of elastic device 107 is lower than that of elastic device 108. In this way, the angular oscillations of the crankshaft are more effectively absorbed or dampened by elastic device 107. In addition, the spring assembly 104 comprises a structure 109 for mechanically coupling elastic device 107 in series with elastic device 108.

Figure 5:
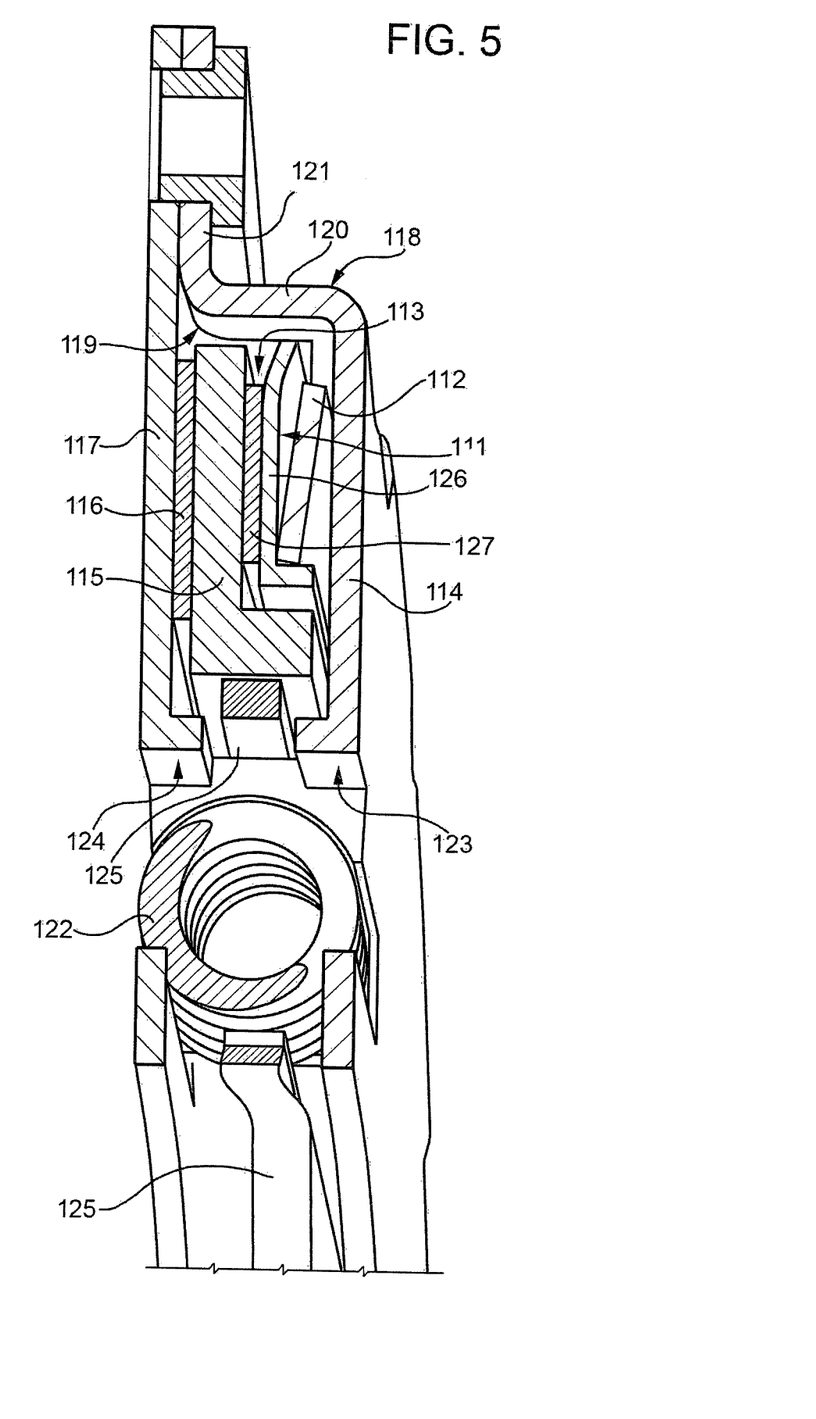
FIG. 5 is a cross-sectional perspective view, with details removed for clarity, of FIG. 4.

In order to reduce torsional vibrations in cases of resonance and to reduce the undesired dynamic effects induced by sudden changes in torque, the flywheel 100 comprises a friction damping device 111 acting on the structure 109 and, preferably, interposed between the structure 109 and the secondary mass 103. The friction damping device 111 is a dry friction device and comprises a spring 112 and a friction element 113 loaded in a substantially axial direction by the spring 112, which is preferably a Belleville spring. The spring 112 is loaded by the action of a wall 114 connected to the secondary mass 103 in a manner rigid in rotation and a wall 115 connected to the structure 109 in a manner rigid in rotation. According to a preferred embodiment of the present invention, wall 115 is interposed between two friction elements of the friction device 111, in particular the friction element 113 and a layer 116 arranged on the side axially opposite to the friction element 113 with respect to the wall 115 and therefore having a friction effect parallel to that of the friction element 113 between the structure 109 and the secondary mass 103. Advantageously, the friction element 113 and the layer 116 are both loaded by the same force applied via the spring 112.

Furthermore, the spring 112 can be mounted between components that are rotationally fixed with one another to avoid wear in the circumferential direction. Advantageously, the friction element 113 is constrained to the secondary mass 103 in a manner rigid in rotation and free to move axially, and the spring 112 is interposed between wall 114 and the friction element 113.

In particular, the flywheel 100 comprises a preassembled unit having a wall 117 that touches the secondary mass 103 and a shaped element 118 formed to define, with wall 117, an annular compartment 119. The annular compartment 119 houses, at least in the axial direction, the friction device 111, or rather at least the spring 112, the friction element 113, wall 115 and the layer 116. In particular, to define the annular compartment 119, the shaped element 118 comprises wall 114, a cylindrical wall 120 extending from the circumference of wall 114 and a flange 121 extending radially from the cylindrical wall 120 on the axially opposite side of wall 114 and rigidly connectable to wall 117. The shaped element 118 is advantageously made of sheet metal.

In addition, walls 114 and 117 define a support for the elastic device 108. In particular, the elastic device 108 can include compression or cylindrical coil springs 122 and walls 114 and 117 can delimit a respective window 123, 124 to define a radial and circumferential position of each compression spring 122. Advantageously, walls 114 and 117 are set apart axially to also house a disc 125 or a wall functionally similar to the structure 109 and configured so as to rotate angularly with respect to walls 114 and 117 to load the compression springs 122. In addition, wall 115 is connected to the disc 125 in a manner rigid in rotation and free to move axially to operate the friction device 111 independently of the relative angular position between the structure 109 and the secondary mass 103. In this way, it is possible to take up axial play due to wear on layer 116.

Advantageously, wall 115 and the friction device 113 define an axial cam—cam follower device to vary the friction damping action based on the relative angular position between the structure 109 and the secondary mass 103. In particular, the action of the friction device 11 is the sum of two contributions, of which one is constant and envisages the application of friction torque in the range between 5 and 50 Nm and the other is variable between 0 and 150 Nm. In particular, the resulting friction between the structure 109 and the secondary mass 103 ranges through all the combinations of the two contributions and, in particular, the constant contribution or the variable contribution can be null. Advantageously, friction grows as the relative angular position between the structure 109 and the secondary mass 103 increases, following a circumferential movement of the structure 109 that causes the loading of the elastic devices 107, 108. It is also possible that when the torque transmitted by the flywheel 100 reaches a threshold, the increase in friction load is such as to make the structure 109 and the secondary mass 103 fixed in rotation.

In a preferred embodiment of the present invention, wall 115 has a variable axial thickness in the circumferential direction to define a cam and the friction element 113 defines a corresponding cam follower. Preferably, the friction element 113 comprises an annular support 126 of variable axial thickness in the circumferential direction and a layer 127 of friction material carried by the annular support 126. The annular support 126 has a plurality of radial ridges that engage respective axial grooves defined by the cylindrical wall 120 to define a coupling substantially rigid in rotation and free to move axially with the shaped element 118. The axial profiles of wall 115 and the annular support 126 accomplish the combinations of the previously mentioned constant and variable contributions. Advantageously, it is possible that the axial profiles are such as to define constant friction damping up to a predetermined value of the relative angular position between the structure 109 and the secondary mass 103 and progressive damping as the relative angular position grows beyond this predetermined value, until a maximum damping value is reached. The relative angular position is considered to be growing in the condition, also described in the foregoing, in which the load on the elastic devices 107, 108 grows.

Constructionally, the flywheel 100 can be designed to reduce the number of components, simplifying assembly operations and reducing the inertia of the structure 109 and, in consequence, enabling improved dissipation of the energy that can be accumulated by the structure 109 during high-speed rotation.

In particular, the first stage 105 comprises a first and a second spiral spring 128, 129 having respective geometrical dimensions like those discussed with regard to elastic element 5, respective first end portions 130 (of which only one is shown) fixed with respect to a peripheral cylindrical wall 130 of the primary mass 102, and respective second end portions 131, 132 opposing the first end portions 130 and rigidly connected to a body 133 of the structure 109 radially surrounded by the spiral springs 128, 129. The body 133 therefore has a smaller radial size with respect to the space occupied by the spiral springs 128, 129. Furthermore, the body 133 is radially supported by a bushing of a tubular portion 134 carried by either the secondary mass 103 or the primary mass 102, this tubular portion being, in turn, radially supported by a tubular element (not shown) carried by the other of the primary mass 102 or the secondary mass 103.

Advantageously, a low friction effect, namely lower than that of the friction device 111 by at least one order of magnitude, for example 2-5 Nm or 1.5-3.5 Nm and preferably approximately 2 Nm, is applied both between the secondary mass 103 and the structure 109 and between the structure 109 and the primary mass 102. This friction is applied by a friction device, if necessary, comprising a spring to take up wear and having a small radial size, i.e. radially smaller than both the structure 109 and the first and second stages 105, 106.

The spiral springs 128, 129 are placed side by side with the cylindrical springs 122 of the second stage 106 and the disc 125 is connected to the body 133 in a manner rigid in rotation and free to move axially, for example by means of a splined coupling, so as to aid assembly.

The disc 125 is configured to connect the cylindrical springs 122 of the elastic device 108 together in parallel with respect to the structure 109 and is pre-assembled between the shaped element 118 and wall 117 together with the cylindrical springs 122 and the friction device 111.

This pre-assembled unit is rigidly mounted on the secondary mass 103 via a plurality of pins 135 or other fastenings arranged radially on the perimeter and engaging in respective seats defined by the flange 121 and by wall 117 in a radially external position with respect to both the cylindrical springs 122 and the friction device 111.

The flywheel 1, 100 according to the present invention enables the following advantages to be obtained.

The elastic stage, which comprises at least one spiral spring 128, 129, is placed side by side in the axial direction to the stiffer second stage to enhance the decoupling characteristics of the spiral springs, which can thus allow high values of angular travel, obtained through dimensioning the stiffness and because there is no significant friction between the turns of the spiral spring. The turns are not actually in contact with each other or do not apply load generated from centrifugal acceleration by slipping on surfaces concentric to axis A. High values of angular travel with reduced damping are particularly advantageous for filtering sudden oscillations of the crankshaft, for example during the first moments of starting or after sudden braking or rapid acceleration after travelling along a stretch of road at a steady high speed. Performance is also improved through functional subdivisions: the stage with the spiral spring is optimized to be a decoupler that permits wide and lightly dampened oscillations and therefore has low stiffness, and the other stage is designed for overloads and has higher stiffness. Performance is also increased by the combination with a friction device configured to be in parallel to the stage with the greater torsional stiffness.

To reduce inertia, the structure 109 can have its mass concentrated as close to axis A as possible; this can be achieved by arranging the turns of the spiral springs 128, 129 to radially surround at least the body 133, i.e. the maximum radial size of the body 133 is smaller than the maximum radial size of the spiral springs 128, 129 mounted on the primary mass 2.

The structure 109 is subdivided into two components, namely the body 133 and the disc 125, connected to the elastic devices 107 and 108, respectively, and to each other by a splined coupling to simplify assembly of the flywheel 100.

In use, the disc 125 has a substantially fixed axial position and so the splined coupling is mainly useful during assembly.

Figure 2:
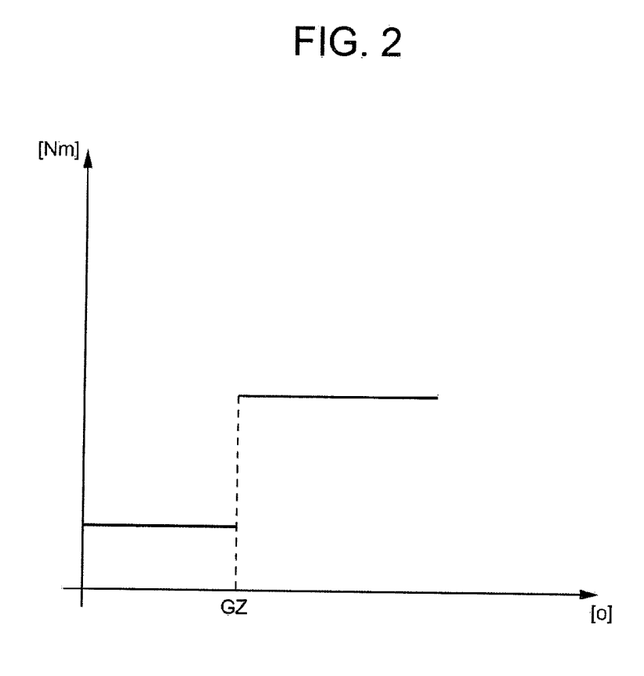
FIG. 2 is a graph of the damping torque applied in the flywheel of FIG. 1.

The friction device 111, applicable both when the flywheel has a structure according to that described with reference to FIGS. 1-3 and to other configurations, is loaded by means of a spring having at least one axial component of action and with the latter being independent of the rotational speed of the flywheel 1, 100. The reliability of the friction effect on the structure 109 is therefore improved because the state of assembly deteriorates in a less significant manner during the service life.

Furthermore, in some applications, the entity of the friction effect for correct operation is such that the radial size of the friction device 111 is relatively large and the reference diameter, upon which the applied friction torque is calculated, is advantageously greater than 120 mm so as to allow compact axial sizes. In addition, the friction device 111 is advantageously connected in parallel to the second stage 106 that has the higher torsional stiffness so that the latter can be activated or mainly carry out its action only in predetermined operating conditions.

When the friction device 111 has a variable effect, it is preferable to vary the friction in a progressive and continuous manner as the relative angular position between the structure 109 and the secondary mass 103 increases. In particular, when the variation is progressive and continuous, or rather without steps due to play or idle angles, dynamic performance is more precisely controllable during the design phase of the flywheel 100.

The friction device 111 can be made in a particularly compact manner in the axial direction by means of an axial cam and cam follower.

The friction device 111, and if necessary the cylindrical springs 122 as well, can be advantageously designed to be part of a preassembled unit in order to simplify assembly of the flywheel 100. For the same purpose, the structure 109 is subdivided into two components, namely the body 133 and the disc 125, connected to the elastic devices 107 and 108, respectively, and to each other by a splined coupling. In use, the disc 125 has a substantially fixed axial position so that the splined coupling is found to be quite advantageous during assembly.

In particular, when elastic device 107 has an overall torsional stiffness lower than that of the elastic device 108, the torque irregularities of the crankshaft are filtered in a particularly efficient manner, such that elastic device 108 can be more compact as it is stressed less. It is therefore possible to provide a further benefit for the sizing of the friction device 111.

Moreover, in the same configuration, it is preferable that the friction device 111 acts between the structure 109 and the secondary mass 103 so that elastic device 107 is directly loaded by the primary mass 102, which, in use, is stressed directly by the crankshaft.

The friction device 111 according to the present invention can also be a dry friction device, in order to avoid seals for grease and other non-solid lubricants.

Arranging the friction device 111 in parallel to the second stage 106 enables the angular movement of the structure 109 to be controlled and limits the undesired effects of resonance in the structure 109.

Figure 3:
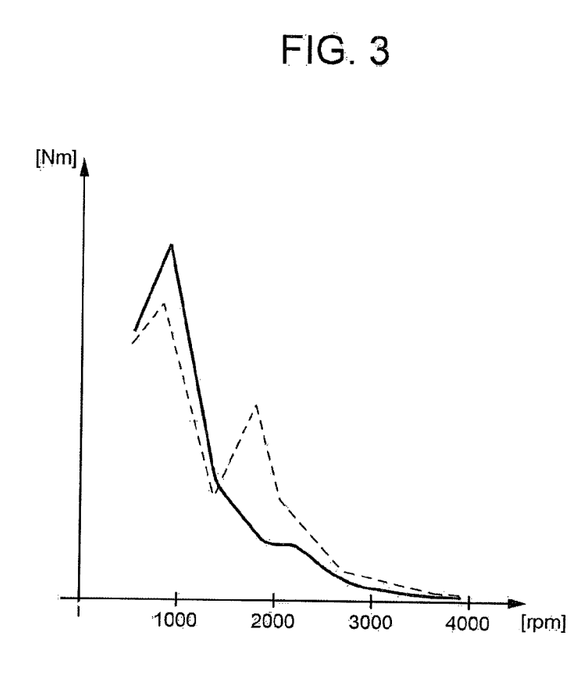
FIG. 3 is a graph of the torsional vibrations measured in a flywheel according to the invention (continuous line) and according to the prior art (dashed line)

After having carried out a test, it was discovered that the peak torsional vibration due to resonance on the spring loader 6 of the flywheel 1 and on the similar structure 109 is at a minimum in the range between 1500 and 2500 revs per minute (see FIG. 3, where the continuous line refers to data of a flywheel according to the invention and the dashed line refers to data of a flywheel according to the prior art). This is due to the beneficial effect of elastic element 5 that acts like a decoupler between the primary mass 2, which rotates with the irregular speed of the crankshaft, and the spring loader 6.

When the elastic element 5 is a spiral spring, the ranges, of the geometric characteristics are focused on obtaining the desired low stiffness or constant elasticity to dampen the vibrations and, at the same time, improved fatigue life.

Furthermore, the overall damping is variable between two discrete levels and adjustable to obtain a specific damping effect between the spring loader 6 and the secondary mass 3 of the flywheel when torsional resonance occurs on the former.

Finally, it is evident that modifications and variations can be made to the flywheel described and illustrated herein without leaving the scope of protection as defined in the appended claims.

The overall stiffness of the coil springs 4 or elastic device 108 can exhibit a linear slope or have a more complex characteristic curve in relation to angular movement v. torque applied by the springs, i.e. a dashed line with more than one linear slope segment. Preferably, the slope is progressive, i.e. stiffness grows with the increase in angular displacement. It is sufficient that the greater stiffness occurs for some load conditions, in particular those that correspond to the larger angular displacements and/or the higher loads.

In alternative, the coil springs have the same elastic constant and/or shape and are angularly equispaced to obtain an improved rotational balance.

Furthermore, an elastic element 5 could comprise more than one spiral spring connected in parallel between the primary mass 2 and the spring loader 6.

In addition, it is possible to envisage that the damping device 111 is rigidly connected to the primary mass 102. In this case, it is also preferable that the second stage 106 has a lower torsional stiffness than that of the first stage 105. The damping device 111 is therefore connected in parallel to the stage that has the greater torsional stiffness.

Figure 6:
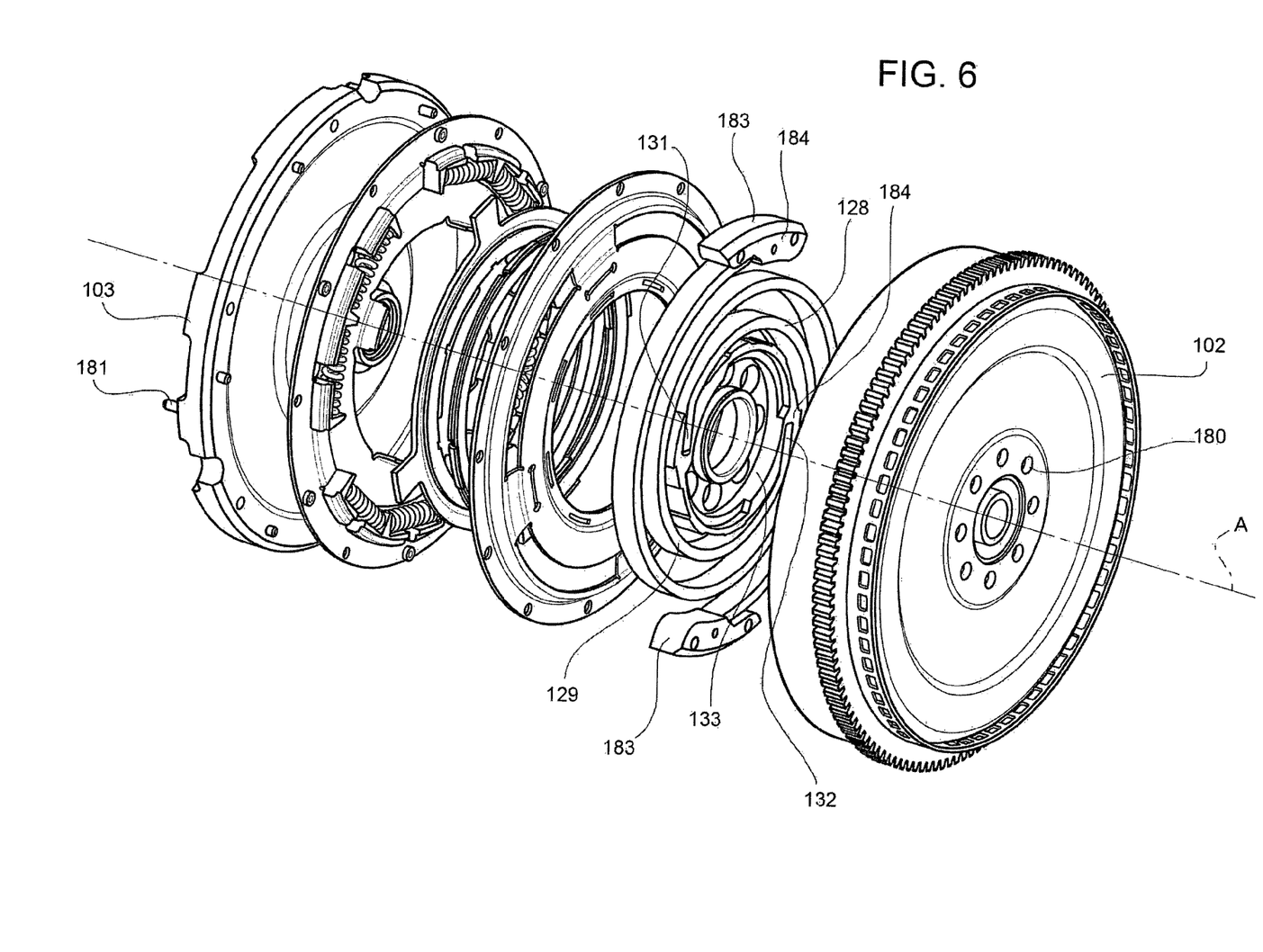
FIG. 6 is an exploded perspective view of a further embodiment of the present invention.

The damping device 111 can also be radially internal with respect to the cylindrical springs 122 (FIG. 6).

The spiral springs 128, 129 can be arranged in a manner so as to be surrounded by the structure 109 in the radial direction.

When the damping device 111 or the damping device of the flywheel 1, preferably operating in parallel to the torsionally stiffer elastic stage, applies a constant friction torque in all the operating conditions of the flywheel 1, 100, this torque is preferably comprised between 20 Nm and 70% of the maximum torque of the internal combustion engine to which the flywheel 1, 100 is associated, preferably in a rear-wheel drive vehicle with a petrol-fueled internal combustion engine. In this way, when the flywheel 1, 100 transmits torque levels close to or higher than that of the internal combustion engine, the torsionally stiffer stage transmits this load through its springs. In addition, when the damping device 111 applies a constant action, the preassembled unit comprising wall 117 and the shaped element 118, formed to define with wall 117 the annular compartment 119, is opportunely reconfigured with respect to that described hereinbefore.

Furthermore, it is possible that the main part of the friction torque is supplied by the device that applies variable friction torque.

It is possible to envisage a damping device 111 according to that described hereinbefore, with particular reference to that regarding FIG. 5, for example in the configuration with cam and cam follower for obtaining a variable friction torque also between the primary mass 102 and the secondary mass 103 when the spring assembly 104 does not have two stages, but a single stage comprising at least one spiral spring 128, 129 and/or a spring for the elastic element 5. This flywheel can be applied, for example, to front-wheel drive engines or to rear-wheel drive engines, especially low-power ones.

Advantageously, the spiral springs 128, 129 and/or the springs for the elastic element 5 are wound in the direction of rotation of the crankshaft, i.e. when the crankshaft drives the primary mass 2, 102, the spiral spring coils up. In this way, the effect of the centrifugal acceleration acting on the spiral springs tends to reduce the state of tension inside the springs.

Often, the primary mass 2, 102 has means of connection 180 (see FIG. 6, for example) to the crankshaft, such as screws or associated seats for example, arranged on a circumference having a relatively small diameter. The secondary mass 3, 103 is connected to the clutch with further means on connection 181, for example screws or associated seats in this case as well, arranged along a circumference having a diameter greater than that of the primary mass 2, 102.

The spiral springs 128, 129 and the springs for the elastic element 5 can be connected to the primary mass 2, 102 or to the secondary mass 3, 103 by at least one cap element 183 of limited circumferential size to reduce bulk. Each cap element is hollow and houses the end portion 30 of the spiral spring 128, 129 by surrounding it on all sides. Advantageously, the cap element is made by sintering.

Furthermore, each end portion of the spiral spring 128, 129 and the spring for the elastic element 5 is fastened by means of a single pin 184, arranged parallel to the axis of rotation A. The pin is housed in an associated seat defined partially by the end portion of the spiral spring 128, 129 and partially, for example, by the cap element 183 for the end portion 130 and by the body 133 for the end portion 131. In the direction of the short side of the cross-section of the spring, the portion of the seat defined by the end portion 130, 131 of the spiral spring 128, 129 is between 0.5 and 2 mm deep, preferably between 0.7 and 1 mm so as not to have an excessive impact on the resistant section of the end portion. As a further way for localizing the zone with the lowest strain, it has been verified that the intrados of end portion 130 and the extrados of end portion 131 are the optimal zones for the seat portion of the respective pin.

It has been found that the stiffness values of the spiral spring 128, 129 or of the elastic element 5 that have a positive effect on the performance of the flywheels 1, 100 are in the range between 6 and 12 Nm/deg, in particular between 7 and 10 Nm/deg.

The invention claimed is:

1. A dual mass flywheel comprising:
   a primary mass,
   a secondary mass angularly movable with respect to said primary mass, and
   a spring assembly to connect said primary mass to said secondary mass, the spring assembly comprising:
      a first spring stage comprising at least one spiral spring,
      a second spring stage having a torsional stiffness greater than that of the said first spring stage, and
      a structure configured to connect said first spring stage in series with said second spring stage,
      wherein said at least one spiral spring comprises a first end portion rigidly connected to said primary mass or to said secondary mass and a second end portion connected to a body of said structure, said first spring stage as a whole being placed side by side, in the axial direction, to said second spring stage.

2. A flywheel according to claim 1, wherein said body is radially surrounded by said at least one spiral spring and is radially supported by and surrounds a tubular portion of one of said primary and secondary masses.

3. A flywheel according to claim 1, wherein said second spring stage comprises a plurality of cylindrical springs.

4. A flywheel according to claim 1, further comprising a friction device arranged in parallel to said structure and said second spring stage and comprising an axial loading spring acting against at least one friction element positioned to dampen the torsional oscillations within said flywheel so as to generate a friction effect substantially independent of the rotational speed of said flywheel.

5. A flywheel according to claim 4, wherein said friction device is a dry friction device.

6. A flywheel according to claim 4, wherein said friction device applies a variable damping action in a manner dependent on the relative angular position between said structure and said primary mass or secondary mass.

7. A flywheel according to claim 6, wherein said friction device comprises an axial cam and a cam follower.

8. A flywheel according to claim 6, wherein said friction device is configured to apply a constant friction torque and a variable friction torque summed to said constant friction torque, wherein the variable friction torque is in the range between 0 and 150 Nm.

9. A flywheel according to claim 4, wherein said friction device applies a constant friction torque in the range between 20 Nm and 70% of the maximum torque of the engine to which it is associated.

10. A flywheel according to claim 4, wherein one of said first and second spring stages comprises a first and a second element connected to each other and defining an annular compartment radially delimited by a cylindrical wall, said annular compartment housing said friction device and said first and second elements being connected to said primary mass or secondary mass.

11. A flywheel according to claim 10, wherein at least one of said first and second spring stages comprises a plurality of cylindrical springs and in that said first and second elements are configured to be loaded in a circumferential direction by the action of said cylindrical springs.

12. A flywheel according to claim 10, wherein said disc is axially interposed between said first and second elements, and said body is connected to said disc in a manner rigid in rotation and free to slide axially.

13. A flywheel according to claim 1, wherein said structure comprises a disc to load one of said first and second spring stages, wherein said disc is connected to said body in a manner rigid in rotation and free to move axially.

14. A flywheel according to claim 1, further comprising a cap element rigidly connected between one of said primary and secondary masses and said at least one spiral spring and having a cavity housing an end portion of said at least one spiral spring.

15. An assembly comprising an internal combustion engine and a flywheel according to claim 1, wherein said primary mass is connected to a crankshaft and said first spring stage is connected between said primary mass and said structure.

* * * * *